US011400741B2

(12) United States Patent
Mathew et al.

(10) Patent No.: US 11,400,741 B2
(45) Date of Patent: Aug. 2, 2022

(54) GROUP IV METAL CHELATES AND THEIR USE IN RADIATION CURABLE INK AND COATING COMPOSITIONS

(71) Applicant: SUN CHEMICAL CORPORATION, Parsippany, NJ (US)

(72) Inventors: Mathew C. Mathew, Cedar Grove, NJ (US); David Biro, Rockaway, NJ (US); Aldo Bruccoleri, Calgary (CA)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/959,323

(22) PCT Filed: Jan. 9, 2019

(86) PCT No.: PCT/US2019/012846
§ 371 (c)(1),
(2) Date: Jun. 30, 2020

(87) PCT Pub. No.: WO2019/139948
PCT Pub. Date: Jul. 18, 2019

(65) Prior Publication Data
US 2020/0391535 A1  Dec. 17, 2020

Related U.S. Application Data

(60) Provisional application No. 62/615,140, filed on Jan. 9, 2018.

(51) Int. Cl.
*B41M 5/00* (2006.01)
*C09D 11/101* (2014.01)
*C09D 4/06* (2006.01)
*C09D 11/107* (2014.01)
*C09D 135/02* (2006.01)

(52) U.S. Cl.
CPC ............ *B41M 5/0023* (2013.01); *C09D 4/06* (2013.01); *C09D 11/101* (2013.01); *C09D 11/107* (2013.01); *C09D 135/02* (2013.01)

(58) Field of Classification Search
CPC .. C09D 135/02; C09D 11/101; C09D 11/107; C09D 11/03; B41M 7/0081; B41M 5/0023; B41J 11/002
See application file for complete search history.

(56) References Cited

U.S. PATENT DOCUMENTS

| 3,682,688 | A  | 8/1972  | Hughes et al. |
| 5,821,276 | A  | 10/1998 | Duncan |
| 6,599,958 | B2 | 7/2003  | Lilley |
| 9,139,716 | B2 | 9/2015  | Crandon et al. |
| 2002/0040073 | A1 | 4/2002  | Stone et al. |
| 2009/0000508 | A1 | 1/2009  | Edison et al. |
| 2009/0104464 | A1 | 4/2009  | Galbo et al. |
| 2015/0148440 | A1 | 5/2015  | Cohen et al. |

FOREIGN PATENT DOCUMENTS

| CN |        107216715 A | 9/2017 |
| JP |        2015-174994 A | 10/2015 |
| WO | WO 1995/028436 A1 | 10/1996 |
| WO | WO 2016/140950 A1 | 9/2016 |

OTHER PUBLICATIONS

Written Opinion of the International Searching Authority issued in PCT/US 19/12846 dated Apr. 9, 2019.
Ananthachar 'UV Lithographic Inks from self-photoinitiating resins for food packaging applications', Ashland Water Technologies, Apr. 9, 2008 (Apr. 9, 2008), pp. 1-8 (retrieved on Mar. 14, 2019 from https://www.radtech.org/proceedings/2008/papers/094.pdf); p. 1, p. 3.
Ciba 'Ciba IRGACURE 819', Ciba Specialty Chemicals, Aug. 30, 2001 (Aug. 30, 2001), pp. 1-3 (retrieved on Mar. 14, 2019 from http://www.xtgchem.cn/upload/20110629045602.PDF); p. 1.
International Preliminary Report on Patentability issued in PCT/US 19/12846, dated Apr. 21, 2020.
Extended European Search Report issued in counterpart EP Application No. 19738622.0 dated Sep. 17, 2021.

*Primary Examiner* — Sanza L. McClendon
(74) *Attorney, Agent, or Firm* — Marian E. Fundytus; Ostrolenk Faber LLP.

(57) ABSTRACT

Described herein are inks and coating compositions curable by exposure to UV energy sources including UV-LED energy sources, which include a polymerizable component selected from an ethylenically unsaturated materials, a photoinitiator component that is one or more photoinitiators, one of which is an acyl phosphine oxide photoinitiator; and a Group IV metal chelating agent. Improved cured is realized for the described inks and coating compositions.

21 Claims, No Drawings

GROUP IV METAL CHELATES AND THEIR USE IN RADIATION CURABLE INK AND COATING COMPOSITIONS

CROSS REFERENCE TO RELATED APPLICATIONS

The present application is a § 371 National Phase application based on PCT/US2019/012846 filed Jan. 9, 2019, which claims the benefit of U.S. Provisional Application No. 62/615,140 filed Jan. 9, 2018, the subject matter of each of which is incorporated by reference in their entirety.

FIELD OF THE INVENTION

The present invention is directed to radiation curable inks and coating composition and the inclusion of group IV metal chelating agents in same.

BACKGROUND

In recent years, UV-LED (light emitting diode) chip technology has markedly improved in power and efficiency at wavelengths compatible with the photo-polymerization of UV-curable inks, coatings and adhesives. The emergence of high brightness UV-LED chips has enabled the development of a new class of UV-LED curing systems. The radiant power and intensity emitted by these UV-LED systems rival that of traditional UV lamps. Advantageously, the UV-LED curing systems avoid the undesirable consequences that restricted the adoption of conventional UV technology. As a result there is an ongoing shift in the market place to UV-LED curing and away from traditional mercury vapor UV lamps.

This trend is leading to the development of UV-LED curable inks and coatings that exhibit faster cure, particularly under the most powerful UV wavelengths for LED emissions, which are between 385 and 395 nanometers (nm), e.g., powerful for light intensity. However, most of the commercially available UV-LED ink systems lack press speeds.

UV-LEDs are semiconductor light sources emit light energy while generating significantly less heat than conventional light sources (and thus are more energy efficient). The lifetime of a UV-LED is significantly greater than that of a conventional light source. LED lamps are advantageous because of the inherently small size of LED units, their longer lifetimes, their robustness, and their ability to be easily engineered, for example into commercial printing systems. Also, as mentioned, they are more energy efficient.

In photocuring with UV-LED light sources, the photoinitiators present in the inks and coating have to be compatible with the wavelength of the specific light source, that is, they have to initiate a free radical polymerization reaction in the unsaturated components of the ink or coating when exposed to the wavelengths emitted by the light source. While traditional mercury arc lamps typically have a polychromatic emission spectrum and emit light in all regions of the UV-visible spectrum (200 to 450 nm), UV-LED lamps may have a narrower emission band in the range 365-420 nm. The photoinitiators in the inks and coatings should thus absorb in the region between 365 nm and 420 nm in order to make full use of UV-LED technology and their increasing power.

Moreover, since high concentrations of photoactive substances are usually required for LED applications, e.g., about 4.0 wt % to about 20 wt %, the photoinitiators should have a high compatibility with the photopolymerizable system. The inks and coatings of the present invention could also be suitable for traditional (non-LED) cure.

One particular class of photoinitiators that is useful for LED curing, and is also suitable for traditional UV cure, are phosphine oxides. Acyl phosphine oxides provide cure at good depth, i.e., depth below the surface of the ink, but relatively poor surface cure. This may be due to the oxygen sensitivity of the phosphinyl radicals that form upon exposure to UV energy. Surface cure can be improved by the addition of tertiary amines, which scavenge oxygen, but the solvolytic stability must be taken into account, allowing nucleophilic hydrolysis by any basic materials. Acyl phosphine oxides are operable at 370 nm to 44 nm.

References that may be of interest include US 2009/0104464 and U.S. Pat. Nos. 9,139,716 and 5,821,276.

SUMMARY OF THE INVENTION

The present invention relates to UV and UV-LED curing inks and coatings, especially flexographic inks that exhibit good cure, printability, low migration, IPA rub resistance and adhesion to flexible substrates, such as films used for food packaging and labeling of commercial articles.

Applicants have surprisingly found that excellent ink properties are exhibited by the inks and coatings described herein after curing UV-LED light sources and traditional UV light sources as well. The inks and coatings described herein include acyl phosphine oxide photoinitiators and a group IV metal chelating agent, in addition to components polymerizable by free radical pathways.

Described herein are UV-curable inks and coatings curable by exposure to UV-LED light sources and traditional UV light sources that comprise: a polymerizable component selected from an ethylenically unsaturated monomer, an ethylenically unsaturated oligomer, an ethylenically unsaturated prepolymer, and combinations thereof, a photoinitiator component comprising one or more photoinitiators, wherein the one or more photoinitiators includes an acyl phosphine oxide photoinitiator; and a Group IV metal chelating agent, such as, for example a titanium-containing chelating agent and/or a zirconium containing chelating agent.

In one aspect, the Group IV metal chelating agent is a titanium-containing chelating agent, a zirconium-containing chelating agent, and a combination thereof.

In one aspect, the inks and coatings include 0.5 wt % to 20% of the group IV metal chelating agent, preferably 0.5 wt % to 10 wt %, and more preferably 1.0 wt % to 10 wt %, based on the total weight of the composition.

DETAILED DESCRIPTION OF THE INVENTION

As used herein, the term "ethoxylated" refers to chain extended compounds that include ethylene oxide as the chain extender.

"Propoxylated" refers to chain extended compounds that include propylene oxide as the chain extender.

"Alkoxylated" refers to chain extended compounds that include ethylene oxide and propylene oxide as chain extenders.

A "prepolymer" is an oligomer or other macromolecule that is capable of further polymerization.

It has been found that the curing of inks by traditional UV light sources and UV-LED sources is markedly improved with the inclusion of acylphosphine oxide photoinitiators and a group IV metal chelating agent. The improvement has been noted particularly in flexographic inks and also has been found in other ink systems, for example gravure, digital, screen, litho, among others.

Examples of Group IV Metal Chelating Agents

There are numerous kinds of chelating agents that may be used in the described inks and coatings. Exemplary kinds are described below.

1. Titanium Orthoesters

The Ti(IV) chelate may be a titanium orthoester in which the titanium is chelated to one or more of a hydroxyl acid, phosphate, polyol, diketo, hydroxy keto or amino alcohol compound. They include for example, but are not limited to:

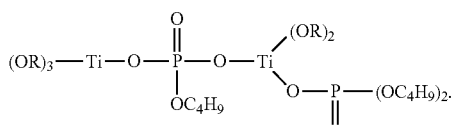

Tyzor® IAM – a titanium-based phosphate complex

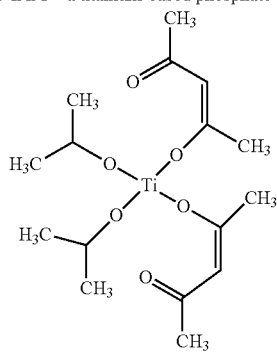

Titanium Acetyl Acetonate

2. Tetraalkyl Titanates

Tetraalkyl titanates are represented by the general structure Ti(OR)$_4$, where R is C$_3$ to C$_8$ alkyl.

Examples include:
TYZOR® TPT tetraisopropyl titanate (Ti(OC$_3$H$_7$)$_4$)
TYZOR® TnBT-tetra-n-butyl titanate (Ti(OC$_4$H$_9$)$_4$)
TYZOR® TOT-tetrakis(2-ethylhexyl)titanate (Ti(OCH$_2$CHC$_4$H$_9$)C$_2$H$_5$)

3. Titanate Chelates of Formula (I):

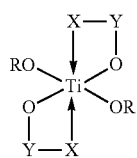

Wherein X is a functional group containing oxygen or nitrogen; Y is a two- or three-carbon chain; and R is C$_1$ to C$_8$ alkyl.

The above is a transition metal complex with the ligand is attached to the metal via a coordinate bond. In coordination chemistry, a ligand is an ion or molecule (functional group) that binds to a central metal atom to form a coordination complex. The bonding with the metal generally involves formal donation of one or more of the ligand's electron pairs.

Examples of Organic Titanates & Zirconates
Examples are listed in Table 1 below:

TABLE 1

| Chemical Name | CAS No. |
| --- | --- |
| Tetra n-Butyl Titanate | 5593-70-4 |
| Tetra Isopropyl Titanate | 546-68-9 |
| Tetra 2-Ethylhexyl Titanate | 1070-10-6 |
| Poly Butyl Titanate | 162303-51-7 |
| Isopropyl Butyl Titanate | 68955-22-6 |
| Tetra n-Propyl Titanate | 3087-37-4 |
| Tetra Ethyl Titanate | 3087-36-3 |
| Tetra t-Butyl Titanate | 3087-39-6 |
| Tetra n-Propyl Zirconate | 23519-77-9 |
| Tetra n-Butyl Zirconate | 1071-76-7 |

Examples of Titanium and Zirconium Chelates
Examples are listed in Table 2 below:

TABLE 2

| Chemical Name | CAS No. |
| --- | --- |
| titanium diisopropoxide bis(acetylacetonate). | 17927-72-9 |
| butyl titanium phosphate | 109037-78-7 |
| triethanolamine titanate | 36673-16-2 |
| di-iso-propoxy titanium bis ethyl acetoacetate | 27858-32-8 |
| alkonolamine titanate complex (titanium, diethylene glycol ethylene glycol triisopropanolamine complex, per CAS description) | 68784-47-4 |
| alkonolamine titanate complex (titanium, diethylene glycol propylene glycol triethanolamine complex, per CAS description) | 68784-48-5 |
| alkonolamine titanate complex (titanium, (s) - lactate polyethylene glycol triisopropanolamine ammonium complex, per CAS description) | 1072830-14-8 |
| titanium ammonium lactate | 65104-06-5 |
| ammonium zirconium lactate acetate | 68909-34-2 |
| triethanolamine zirconate | 101033-44-7 |
| di-iso-butoxy titanium bis ethyl acetoacetate | 83877-91-2 |

The titanium or zirconium chelate materials may be an alkoxide of an unsaturated alcohol. Titanium diisopropoxide bis(acetylacetonate), listed in Table 1, is exemplary.

A partial list of commercially available Ti(IV) chelates includes Vertec PI-2 and 1A-10, as well as Tyzor® TE, Tyzor® IAM, Tyzor® LA, Tyzor® CLA, etc. DuPont and other suppliers also provide zirconium chelate materials.

Adhesion promoters have long been used in liquid inks to improve adhesion and resistance properties to enable the liquid ink formulations to meet the requirements of the customer and the end-user. Titanium based compounds are widely used in liquid inks to improve the adhesion of the color system to substrates such as flexible packaging.

The inks and coatings described herein include 0.5 wt % to 20 wt % of group IV metal chelating agents, preferably 0.5 wt % to 20 wt %, more preferably 1.0 wt % to 10 wt %, based on the total weight of the composition. Inclusion of the chelating agents, in combination with acylphosphine oxide photoinitiators, vastly improves UV curing, whether by traditional UV sources or UV-LED sources, and especially in flexographic inks.

Applicants have found that the combination of an acylphosphine oxide photoinitiator and a group IV metal chelating agent (e.g., a titanium- or zirconium-containing chelating agent greatly improve the curing properties of UV curable ink. In particular, inks and coating compositions that include the combination of the acylphosphine oxide photoinitiator and the group IV metal chelating agent (in addition of the polymerizable components) effectively cure when exposed to UV-LED light energy. Thus, while there is great promise in UV-LED technology, heretofore the realization of the promise has been somewhat frustrated by the difficulties in providing ink and coating formulations that cure acceptably upon exposure to UV emitted by LED. The present ink and coating formulations provide a solution to the problem not yet existent in the art.

While most commercially available UV-LED ink systems suffer from lack of surface cure at higher speeds due to oxygen inhibition, significant benefits and advantages are exhibited by the inks and coating described herein. Among them are:

Curing occurs effectively at high press speeds using 395 nm UV-LED light sources;

The inks and coatings, after curing, exhibit excellent chemical resistance and rub resistance, as evidenced by the results of the isopropanol rub test;

After curing, the inks and coatings contain very small amounts of migratable components (e.g., unreacted monomer, photoinitiator), and thus they are safe for use on food packaging;

The inks and coatings exhibit excellent tape adhesion to variety of polymeric substrates;

White inks exhibit good opacity. Colored ink exhibits high color density.

The inks and coatings exhibit excellent nail scratch resistance.

The inks and coatings exhibit good printability (trapability).

Acylphosphine Oxide Photoinitiators, and Other Photoinitiators

Any acylphosphine oxide photoinitiator or combination thereof can be used in the present inks and coatings. For example, the acylphosphine oxide photoinitiators disclosed in U.S. Pat. No. 7,615,110, which is incorporated herein by reference, discloses acylphosphine oxide photoinitiators that can be used. In one aspect, the acylphosphine oxide photoinitiator used in the present inks and coatings are one or more of 2,4,6-trimethylbenzoyl-diphenylphosphine oxide; ethyl (2,4,6-trimethylbenzoyl)phenyl phosphinate; and phenylbis(2,4,6-trimethylbenzoyl)phosphine oxide. These acylphosphine oxide photoinitiators have the following CAS numbers: 75980-60-8, 84434-11-7, and 162881-26-7.

In one aspect, the present inks and coatings include a photoinitiator component including at least one an acyl phosphine oxide photoinitiator as described herein, and another photoinitiator (e.g., a photoinitiator that is not an acyl phosphine oxide photoinitiator).

Suitable other photoinitiators include, but are not limited to, the following: α-hydroxyketones such as: 1-hydroxycyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

α-aminoketones such as; 2-methyl-1-[4-(methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one;

thioxanthones such as; 2-4-diethylthioxanthone, isopropylthioxanthone, 2-chlorothioxanthone, and 1-chloro-4-propoxythioxanthone;

benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one;

phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester;

oxime esters such as; 1-phenyl-1,2-propanedione-2-(O-ethoxycarbonyl)oxime; [1-(4-phenylsulfanylbenzoyl)heptylideneamino]benzoate, or [1-[9-ethyl-6-(2-methylbenzoyl)carbazol-3-yl]-ethylideneamino]acetate;

Examples of other suitable photoinitiators include diethoxy acetophenone; benzyl; benzyl dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

Alkyl amino acetophenone photoinitiators may also be used.

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

The photoinitiator component may be present in the ink and coating composition in an amount of 0.5 wt % to 40 wt, preferably 2.0 wt % to 25 wt %, more preferably 5.0 wt % to 20 wt %, based on the total weight of the composition.

The acyl phosphine oxide photoinitiator may be present in the ink and coating composition in an amount of 0.5 wt % to 10 wt %, preferably 1.0 wt % to 6.0 wt %, more preferably 1.0 wt % to 4.0 wt %, based on the total weight of the composition.

Polymerizable Component

The polymerizable component selected from an ethylenically unsaturated monomer, an ethylenically unsaturated oligomer, an ethylenically unsaturated prepolymer, and combinations thereof may be present in the ink and coating composition in an amount of 10 wt % to 90 wt, preferably 60 wt % to 90 wt %, more preferably 70 wt % to 90 wt %, based on the total weight of the composition.

The inks and coatings of the present application comprise polymerizable components that undergo curing when in the presence of photoinitiators and exposed to light energy emitted from a UV light source (including UV-LED light sources). The polymerizable component is selected from an ethylenically unsaturated monomer, an ethylenically unsaturated oligomer, an ethylenically unsaturated prepolymer, and combinations thereof.

In one aspect, the present inks and coatings include, as a polymerizable component, at least one unsaturated monomer and at least one prepolymer consisting of an oligomer, preferably selected from the group consisting of epoxyacrylates, acrylated oils, urethane acrylates, polyester acrylates, polyether acrylates, vinyl/acrylic oligomers and polyene/thiol systems.

Examples of suitable monofunctional ethylenically unsaturated monomers include but are not limited to:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; isostearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy)ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy)ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate, and combinations thereof. Methacrylate counterpart compounds to the above may also be included (e.g., isobutyl methacrylate to isobutyl acrylate), although those skilled in the art will appreciate that methacrylate compounds have lower reactivity than their equivalent acrylate counterparts.

Examples of suitable ethylenically unsaturated multifunctional monomers include but are not limited to the following:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate, and combinations thereof. Methacrylate counterpart compounds to the above may also be included, but are not as preferable as the acrylates for the above-stated reasons.

One of several preferred ethylenically unsaturated monomers is 3-methyl-1,5-pentanediol diacrylate, for providing lower viscosity inks with good UV cure and low migration.

Other functional monomers capable of being included in the present inks and coatings include cyclic lactam such as N-vinyl caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

Combinations of all of the above monomers may also be used.

The at least one prepolymer consisting of an oligomer may preferably be selected from the group consisting of epoxy acrylates, acrylated oils, urethane acrylates (aliphatic and aromatic), polyester acrylates, polyether acrylates, vinyl/acrylic oligomers and polyene/thiol systems.

Colorants

Suitable colorants include, but are not limited to organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorant employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

Other Inclusions

Amine Synergists

An amine synergist may be included in the formulation. Suitable examples include, but are not limited to, the following:

Aromatic amines such as; 2-(dimethylamino)ethylbenzoate; N-phenyl glycine; benzoic acid, 4-(dimethylamino)-, 1,1'-[(methylimino)di-2,1-ethanediyl]ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable;

Aliphatic amines such as N-methyldiethanolamine, triethanolamine and triisopropanolamine; Aminoacrylates and amine modified polyether acrylates EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 ex DSM-AGI.

Waxes

The printing ink may also include waxes such as but not limited to amide wax, erucamide wax, polypropylene wax, paraffin wax, polyethylene wax, teflon, carnauba wax and the like. The wax may be a combination of said waxes. It is preferred that the wax be a blend of amide and erucamide waxes. The wax, if present, is in an amount of up to about 4 wt %. It is preferred that the wax be present in an amount from about 0 wt % to about 2 wt %.

Other additives and inclusion that have been added to state-of-the-art inks and coating compositions may added to the present inks and coatings to improve one or more properties. A partial list of such additives includes but is not limited to: adhesion promoters, silicones, light stabilizers, de-gassing additives, ammonia, flow promoters, defoamers, antioxidants, stabilizers, surfactants, dispersants, plasticizers, rheological additives, waxes, silicones, etc.

The following examples are directed to embodiments of the principles described herein. They are not intended to limit the scope of the disclosure and the invention(s) claimed herein, and should not be construed as limiting same.

EXAMPLES

Printing of Inks and Coatings onto Substrates:

The exemplary inks described below were printed on various substrates with a flexo hand proofer with 500 line 3.0 BCM anilox roller.

Test Methods:

Tape Adhesion:

3M 600 film tape was used to test adhesion. A fast peel test was performed after printing and curing of the ink or coating that is applied to the substrate. The film tape is adhered to the substrate over the printed cured ink and then rapidly removed by hand in one continuous motion. The reported adhesion value represents the amount of ink as a percentage that remains on the substrate, where 100% is best and 0% is worst. 0% means all of the ink is removed by the tape and 100% means 100% of the ink remained on the substrate.

IPA Rub Resistance:

After printing and curing of the ink or coating that is applied to the substrate, the inked areas of the substrate are rubbed with a cotton swab soaked with isopropyl alcohol (IPA) until failure or breakthrough of the substrate film. The rubs are double rubs, i.e., one forward rub and one backward rub equals one double rub. In the test, a cotton swab is dipped into IPA and double rubs were performed on the surface of the substrate coated with the ink until the ink coating began to break. For an ink to exhibit acceptable rub resistance, it has to be able to withstand at least 10 double rubs.

Curing:

The inks described in the examples below are cured by exposure to UV energy emitted by LED (typically 365-420 nm, more specifically 385-395 nm) and by exposure to UV energy emitted by traditional UV mercury lamps (typically 200 to 450 nm).

Comparative Example 1 and Inventive Example 2

TABLE 3

Comparative Example 1—LM UV-LED Flexo Green w/o Titanium Chelate

| Material | % |
| --- | --- |
| UV Flexo Green Base[1] | 60.00 |
| UV-LED Varnish[2] | 40.00 |
| Total | 100.00 |

TABLE 4

Inventive Example 2-LM UV-LED Flexo Green with 2.5% Titanium Chelate

| Material | % |
| --- | --- |
| UV Flexo Green Base[1] | 58.50 |
| UV-LED Varnish[2] | 39.00 |
| [5]Ti-C Butyl Titanium Phosphate chelate [Ti(IV) chelate] | 2.50 |
| Total | 100.00 |

TABLE 5

(LED Curing): Prints Cured at 100 meters/min on GEW UV-LED Lab Unit

| Substrate | IPA Double Rubs Comparative Example 1 | IPA Double Rubs Inventive Example 2 | Tape Adhesion Comparative Example 1 | Tape Adhesion Inventive Example 2 |
|---|---|---|---|---|
| Polycoated Board | 6 | 23 | 70% | 100% |
| BOPP (from UK) | 11 | 40 | 10% | 100% |
| Treated BOPP | 7 | 21 | 10% | 100% |
| Pearlised BOPP | 11 | 26 | 10% | 100% |

TABLE 6

(Traditional UV Curing) Medium Pressure Mercury Vapor Lamp at 300 FPM Belt Speed/400 Watts Intensity

| Substrate | IPA Double Rubs Comparative Example 1 | IPA Double Rubs Inventive Example 2 | Tape Adhesion Comparative Example 1 | Tape Adhesion Inventive Example 2 |
|---|---|---|---|---|
| Polycoated Board | 24 | 42 | 70% | 100% |
| Treated BOPP | 31 | 50 | 5% | 80% |
| Pearlised BOPP | 16 | 25 | 50% | 100% |

Tables 5 and 6 show considerable improvement in the chemical resistance (IPA double rubs) exhibited by the Inventive Example 2 when compared to Comparative Example 1. This improvement is exhibited whether UV curing occurs with LED and traditional (i.e., mercury vapor lamp) light sources. Tables 5 and 6 also show considerably superior substrate adhesion for Inventive Example 2 when compared to Comparative Example 1.

[1]—UV Flexo Green Base includes pigment, 29.5% amine modified ethoxylated multifunctional acrylate, ethoxylated multifunctional acrylate and 11.4% a dispersant. The final ink is prepared by placing these materials in a high-speed mixer for several minutes.
[2]—UV-LED Varnish includes multifunctional acrylate monomers (ethoxylated and non-ethoxylated), polyester acrylate oligomer, leveling agents, waxes, optical brighteners, inhibitors, Omnirad 819, available from IGM Resins, an acylphosphine oxide photoinitiator (phenylbis(2,4,6-trimethylbenzoyl)phosphine oxide), and a polymeric isothioxanthone.
[5]Ti—C30 Butyl Titanium Phosphate [Ti(IV) chelate] is supplied as 70% titanium chelate in a 30% blend of ethanol and isopropanol. It is a commercial product available as PUREtiTIC 30 (CAS #109037-78-7 (see Table 2 above).

TABLE 7

Comparative Example 3-UV-LED Flexo Black w/o Titanium Chelate.

| Material | % |
|---|---|
| [3]UV Flexo Black Base | 60.00 |
| UV-LED Varnish[2] | 40.00 |
| Total | 100.00 |

TABLE 8

Inventive Example 4: UV-LED Flexo Black with 2.5% Titanium Chelate.

| Material | % |
|---|---|
| [3]UV Flexo Black Base | 58.50 |
| [2]UV-LED Varnish | 39.00 |
| Ti-C Butyl Titanium Phosphate chelate [Ti(IV) chelate] | 2.50 |
| Total | 100.00 |

The final ink is prepared by placing these materials in a high speed mixer for several minutes.

[3]—UV Flexo Black Base includes pigment, amine modified- and ethoxylated- multifunctional acrylate monomers, and dispersant.

TABLE 9

(LED Curing): Test Results for Prints Cured at 100 Meters/lVlin on GEW UV-LED Lab Unit

| Substrate | IPA Double Rubs Comparative Example 3 | IPA Double Rubs Inventive Example 4 | Tape Adhesion Comparative Example 3 | Tape Adhesion Inventive Example 4 |
|---|---|---|---|---|
| BOPP (Bemis) | 4 | 14 | 0% | 100% |
| Polycoated Board | 7 | 50 | 20% | 100% |
| Clear Polypropylene | 7 | 36 | 0% | 100% |
| Opaque Polypropylene (UK) | 17 | 60+ | 90% | 100% |

TABLE 10

Test Results with Traditional UV Curing Using Medium Pressure Mercury Vapor Lamp at 300 FPM Belt Speed/400 Watts Intensity

| Substrate | IPA Double Rubs Comparative Example 3 | IPA Double Rubs Inventive Example 4 | Tape Adhesion Comparative Example 3 | Tape Adhesion Inventive Example 4 |
|---|---|---|---|---|
| Polycoated Board | 16 | 35 | 75% | 95% |
| Treated BOPP | 8 | 20 | 80% | 90% |

The results reported in Tables 9 and 10 demonstrate that Inventive Example 4 exhibits superior chemical resistance (IPA rubs) versus Comparative Example 3, whether curing takes place by exposure to UV energy emitted by LED or by exposure to UV energy emitted by traditional mercury vapor lamps. The tape adhesion data in Tables 9 and 10 shows a broader range of adhesion to the substrate for Inventive Example 4 versus Comparative Example 3.

TABLE 11

Comparative Example 5-UV-LED Flexo Violet w/o Titanium Chelate.

| Material | % |
|---|---|
| UV Flexo Violet Base[4] | 60.00 |
| UV-LED Varnish[2] | 40.00 |
| Total | 100.00 |

TABLE 12

Inventive Example 6: UV-LED Flexo Violet with 2.5% Titanium Chelate.

| Material | % |
|---|---|
| UV Flexo Violet Base[4] | 58.50 |
| UV-LED Varnish[2] | 39.00 |
| Ti-C Butyl Titanium Phosphate chelate [Ti(IV) chelate] | 2.50 |
| Total | 100.00 |

The final ink is prepared by placing these materials in a high speed mixer for several minutes.

[4]—UV Flexo Violet includes pigment, amine modified- and ethoxylated- multifunctional acrylate monomers, and dispersant.

TABLE 13

(LED Curing): Test Results for Prints Cured at 100 meters/min on GEW UV-LED Lab Unit

| Substrate | IPA Double Rubs Comparative Example 5 | IPA Double Rubs Inventive Example 6 | Tape Adhesion Comparative Example 5 | Tape Adhesion Inventive Example 6 |
|---|---|---|---|---|
| Polycoated board | 7 | 17 | 10% | 100% |
| BOPP (from UK) | 11 | 50 | 20% | 100% |
| Treated BOPP | 7 | 26 | 0% | 100% |
| Pearlised BOPP | 8 | 16 | 0% | 100% |

TABLE 14

Test Results with Traditional UV Curing Using Medium Pressure Mercury Vapor Lamp at 300 FPM Belt Speed/400 Watts Intensity

| Substrate | IPA Double Rubs Comparative Example 5 | IPA Double Rubs Inventive Example 6 | Tape Adhesion Comparative Example 5 | Tape Adhesion Inventive Example 6 |
|---|---|---|---|---|
| Polycoated board | 18 | 30 | 90% | 100% |
| BOPP (from UK) | 29 | 60 | 0% | 90% |
| Treated BOPP | 18 | 40 | 80% | 90% |
| Pearlised BOPP | 6 | 12 | 80% | 100% |

The results reported in Tables 13 and 14 demonstrate that Inventive Example 6 exhibits superior chemical resistance (IPA rubs) versus Comparative Example 5, whether curing takes place by exposure to UV energy emitted by LED or by exposure to UV energy emitted by traditional mercury vapor lamps. The tape adhesion data in Tables 13 and 14 shows a broader range of adhesion to the substrate for Inventive Example 6 versus Comparative Example 5.

TABLE 15

Inventive Example 7-LM UV-LED Flexo Green with 5.0% Titanium Chelate

| Material | % |
|---|---|
| Green UV Flexo Green Base[1] | 57.00 |
| UV-LED Varnish[2] | 38.00 |
| [5]Ti-C Butyl Titanium Phosphate [Ti(IV)chelate] | 5.00 |
| Total | 100.00 |

TABLE 16

(LED Curing) Test results for prints cured at 100 meters/min on GEW UV-LED Lab unit

| Substrate | IPA Double Rubs Inventive Example 2 | IPA Double Rubs Inventive Example 7 | Tape Adhesion Inventive 2 | Tape Adhesion Inventive Example 7 |
|---|---|---|---|---|
| Polycoated Board | 23 | 40 | 100% | 100% |
| Treated BOPP | 21 | 25 | 100% | 100% |
| Pearlised BOPP | 26 | 50 | 100% | 100% |

Table 16 shows improvement in chemical resistance (IPA double rubs) and tape adhesion for UV-cured Inventive Example 7 vs. UV-cured Inventive Example 2 when the amount of Ti Chelate is increased from 2.5% to 5%.

Example 8

A Ti-chelate containing coating that includes self-curing resins was prepared that includes the following:

TABLE 17

Example 8-Composition with self-curing resin

| Component | Amount (wt%) |
|---|---|
| Inhibitor (Genorad 26) | 1.0 |
| 3-methyl-1,5-pentane diol diacrylate | 15.0 |
| EBECRYL LEO ® 10552 | 14.0 |
| Tego ® Variplus 3350 LV | 9.8 |
| Omnirad 819 | 2.0 |
| Omnipol TX | 2.0 |
| Optiblanc PL | 0.2 |
| EBECRYL LEO ® 10103 | 40.0 |
| SR 399 | 10.0 |
| Byk 361 | 1.0 |
| Tyfan AP310 | 5.00 |
| titanium citrate chelating agent | |
| | 100.00 |

Genorad 26 is based on 4-Methoxy Phenol.

EBECRYL® LEO 10552, available from Allnex, is a low viscosity amine modified polyether acrylate oligomer, and acts as an amine synergist.

Tego® Variplus 3350 UV, available from Evonik Industries, is polyester resin in tripropyleneglycol diacrylate (TPGDA).

Omnirad 819, available from IGM Resins, is phenylbis(2,4,6-trimethylbenzoyl)phosphine oxide photoinitiator.

Omnipol TX, available from IGM Resins, is a polymeric thioxanthone photoinitiator.

Optibanc PL, available from 3V Sigma, is an optical brightener.

EBECRYL® LEO 10103, available from Allnex, is a multifunctional acrylate oligomer that is self-curing (in the presence of an amine synergist, the material can enable UV curing without, or with only a minimal amount, of photoinitiator).

SR 399, available from Sartomer Americas, is dipentaerythritol hexaacrylate (DPHA).

BYK 361, available from Byk, is a wetting agent.

Tyfan AP310 is titanium citrate chelating agent

The Example 8 coating was applied to PET-G substrate and to polycoated board in accordance with the coating procedure described previously. For comparison purposes, Solarflex FSP ("FSP" in Table 11), a commercial formulation available from Sun Chemical, was coated on the same substrates and cured. Solarflex FSP is a low migration UV system containing 20.32% photoinitiator.

The colors in Table 11 are result of blending.

UV curing occurred at 400 Watts power at 300 FPM (feet per minute) with a mercury vapor lamp.

TABLE 18

| | PET-G Substrate | | Polycoated Board | |
|---|---|---|---|---|
| | FSP IPA | Example 8 IPA Rubs | FSP IPA | Example 8 IPA Rubs |
| Black | 2 | 32 | 2 | 12 |
| Yellow | 4 | 45 | 4 | 22 |

TABLE 18-continued

|  | PET-G Substrate | | Polycoated Board | |
| --- | --- | --- | --- | --- |
|  | FSP IPA | Example 8 IPA Rubs | FSP IPA | Example 8 IPA Rubs |
| Cyan | 2 | 30 | 2 | 19 |
| Magenta | 4 | 20 | 2 | 10 |

Migration Test—Migratable Component Amounts

Prints were made on polycoated board using 3.2 BCM anilox roller and cured under medium pressure mercury vapor lamp at 300 FPM @ 400 Watts. Migration testing on migratable components was conducted using 95% ETOH food stimulant and extraction conditions of 24 hours at 40 degree C. Sections of each sample were cut and placed into a custom stainless steel extraction cell designed for food contact packaging migration testing. The samples were extracted for 24 hours at 40 degree C. The ethanol was removed from the cells and concentrated to 1 ml using an automated evaporator and the resulting concentrate analysed by GC-MS.

TABLE 19

Migration test results of Cyan based on Example 8 vs. Accuflex Cyan.

| MS Scan # | Area Integration | Peak Assignment | Irradiated Board | Example 8 | Accuflex cyan | SML/Swiss ordinance |
| --- | --- | --- | --- | --- | --- | --- |
|  |  |  |  |  |  | PPB |
| 431 | 11652 | 2,4,6-trimethylbenzaldehyde |  |  | 2.88 |  |
| 588 | 6346 | Butylated bydoxy toluene (BHT antioxidant) |  | 1.09 | 2.05 | 3000 |
| 651 | 9405 | Kodaflex TXIB |  | 1.61 |  | 5000 |
| 650 | 60018 | glyceryl propoxylate triacrylate oligomer (GPTA) |  |  | 13.88 | 50 |
| 668 | 4749 | glyceryl propoxylate triacrylate oligomer (GPTA) |  |  | 46.18 | 50 |
| 761-769 | 33138 | tripropylene glycol, diacrylate (TPGDA) |  |  | 5.23 | 50 |
| 919 | 83102 | 3,5-di-t-butyl-4-hydroxybenzenepropionic acid, ethyl ester | 12.17 | 14.21 | 13.80 |  |
| 1119 | 5871 | 4,8,12,16-tetramethylheptadecane-4-olide | 1.47 | 1.00 | 1.24 |  |
| 1218 | 13593 | Methoxychlor olefin | 3.21 | 2.32 | 3.09 |  |
| 1572 | 207748 | Irgafos 168 antioxidant | 33.29 | 35.52 | 33.42 |  |
| 1651 | 56396 | Irgafos 168 antioxidant (oxidized form) | 20.00 | 9.64 | 10.80 |  |
| 1666 | 11000 | Irganox 1076 antioxidant | 9.86 | 1.86 | 1.36 |  |
| 1077 | 70284 | TPO Liquid UV-photoinitiator |  |  | 11.28 | 50 |
|  |  | Total 95% ETOH Unprinted-Side Extractables | 80.01 | 67.25 | 145.21 |  |

SML is the specific migration limit.

Example 8 Cyan is a low migration ink formulation. The listed migration components do not exceed 50 PPB whereas Accuflex Cyan exceeds SML (GPTA is above 50 PPB)

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An ink or coating composition curable by exposure to UV energy sources comprising:
   (a) a polymerizable component comprising an ethylenically unsaturated monomer, and an ethylenically unsaturated prepolymer,
   (b) a photoinitiator component comprising one or more photoinitiators, wherein the one or more photoinitiators includes an acyl phosphine oxide photoinitiator; and
   (c) a Group IV metal chelating agent selected from a titanium-containing chelating agent, a zirconium-containing chelating agent, and a combination thereof, wherein the Group IV metal of the chelating agent is chelated to one or more of a hydroxy acid, phosphate, polyol, diketo, hydroxy keto, or amino alcohol compound.

2. The ink or coating composition of claim 1, wherein the Group IV metal chelating agent is a titanium orthoester.

3. The ink or coating composition of claim 2, wherein the titanium orthoester is one in which titanium is chelated to one or more phosphate.

4. The ink or coating composition of claim 1, wherein the Group IV metal chelating agent is selected from titanium citrate; butyl titanium phosphate; titanium, diethylene glycol ethylene glycol triisopropanolamine complex; titanium, diethylene glycol propylene glycol triethanolamine complex; titanium, (s)-lactate polyethylene glycol triisopropanolamine ammonium complex; titanium ammonium lactate; ammonium zirconium lactate acetate; triethanolamine zirconate; and combinations thereof.

5. The ink or coating composition of claim 1, wherein the Group IV metal chelating agent is present in the ink and coating composition in an amount of 0.5 wt % to 10 wt %.

6. The ink or coating composition of claim 1, wherein the acylphosphine oxide is selected from 2,4,6-trimethylbenzoyl-diphenylphosphine oxide; ethyl (2,4,6-trimethylbenzoyl)phenyl phosphinate; phenylbis(2,4,6-trimethylbenzoyl)phosphine oxide, and combinations thereof.

7. The ink or coating composition of claim 1, wherein the ethylenically unsaturated monomer is selected from isobutyl acrylate; cyclohexyl acrylate; iso-octyl acrylate; n-octyl acrylate; isodecyl acrylate; iso-nonyl acrylate; octyl/decyl acrylate; lauryl acrylate; 2- propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy)ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2(acryloyloxy)ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3-methyl-1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate; N-vinyl Caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; N,N'-methylenebisacrylamide; and combinations thereof.

8. The ink or coating composition of claim 1, wherein the ethylenically unsaturated prepolymer is selected from epoxy acrylate oligomers, acrylated oil oligomers, urethane acrylate oligomers, polyester acrylate oligomers, polyether acrylate oligomers, vinyl/acrylic oligomers, polyene/thiol oligomer systems, and combinations thereof.

9. The composition of claim 1, wherein the polymerizable component comprises 3-methyl-1,5-pentane diol diacrylate monomer.

10. The composition of claim 1, wherein the polymerizable component comprises ethoxylated trimethylolpropane triacrylate.

11. The composition of claim 1, wherein at least a portion of the polymerizable component comprises an ethoxylated oligomer.

12. The ink or coating composition of claim 1, wherein the photoinitiator component comprises a photoinitiator in addition to an acylphosphine oxide photoinitiator.

13. The ink or coating composition of claim 12, wherein the photoinitiator in addition to an acylphosphine oxide photoinitiator comprises a thioxanthone photoinitiator.

14. A printed article comprising the ink or coating composition of claim 1.

15. An ink or coating composition curable by exposure to UV energy sources, comprising:
(a) a polymerizable component selected from an ethylenically unsaturated monomer, an ethylenically unsaturated oligomer, an ethylenically unsaturated prepolymer, combinations thereof, wherein the polymerizable component comprises a self-curing oligomer;
(b) a photoinitiator component comprising one or more photoinitiators, wherein the one or more photoinitiators includes an acyl phosphine oxide photoinitiator; and
(c) a Group IV metal chelating agent.

16. The ink or coating composition of claim 3, wherein the acylphosphine oxide is selected from 2,4,6-trimethylbenzoyl-diphenylphosphine oxide; ethyl (2,4,6-trimethylbenzoyl)phenyl phosphinate; phenylbis(2,4,6-trimethylbenzoyl)phosphine oxide, and combinations thereof.

17. The ink or coating composition of claim 1, wherein the acylphosphine oxide is selected from ethyl (2,4,6-trimethylbenzoyl)phenyl phosphinate; phenylbis(2,4,6-trimethylbenzoyl)phosphine oxide, and combinations thereof.

18. The ink or coating composition of claim 3, wherein the ethylenically unsaturated prepolymer is selected from epoxy acrylate oligomers, acrylated oil oligomers, urethane acrylate oligomers, polyester acrylate oligomers, polyether acrylate oligomers, vinyl/acrylic oligomers, polyene/thiol oligomer systems, and combinations thereof.

19. The composition of claim 3, wherein the polymerizable component comprises 3-methyl-1,5-pentane diol diacrylate monomer, ethoxylated trimethylolpropane triacrylate and/or an ethoxylated oligomer.

20. The composition of claim 15, wherein the polymerizable component comprises 3-methyl-1,5-pentane diol diacrylate monomer, ethoxylated trimethylolpropane triacrylate and/or an ethoxylated oligomer.

21. A method of preparing a printed substrate comprising:
printing an ink or coating composition of claim 1 on a substrate; and
exposing the ink or coating composition to UV light to cure the ink or coating composition.

* * * * *